April 27, 1926.
G. A. STORRAR
1,582,800
STATION INDICATING SYSTEM
Filed Dec. 3, 1921
5 Sheets-Sheet 1
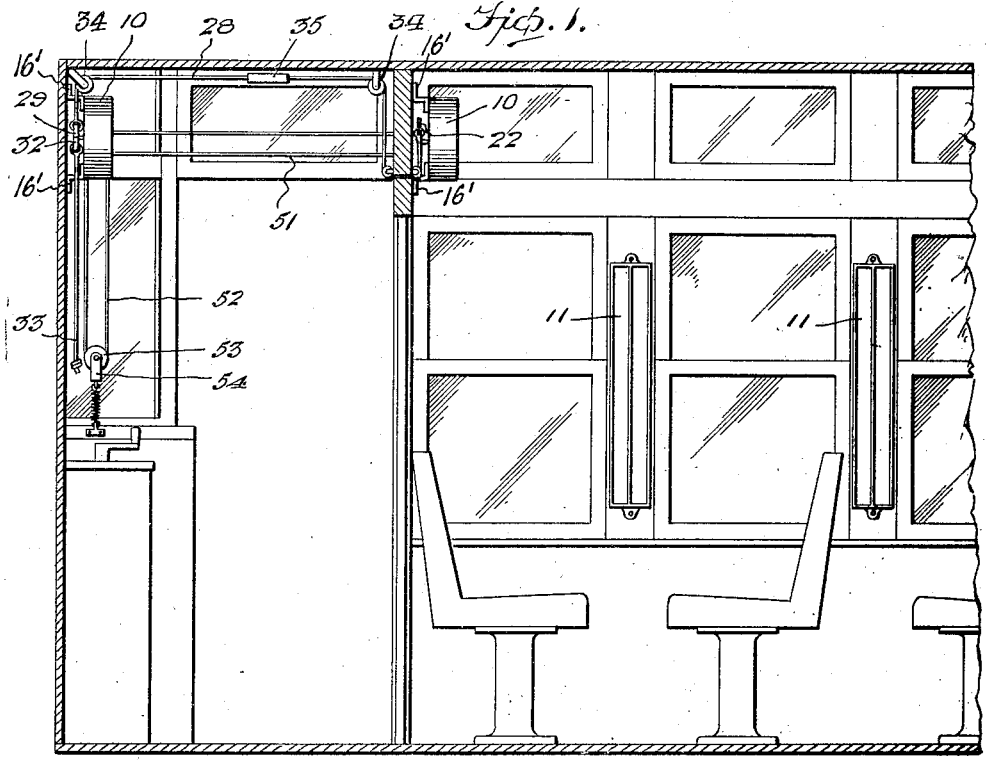
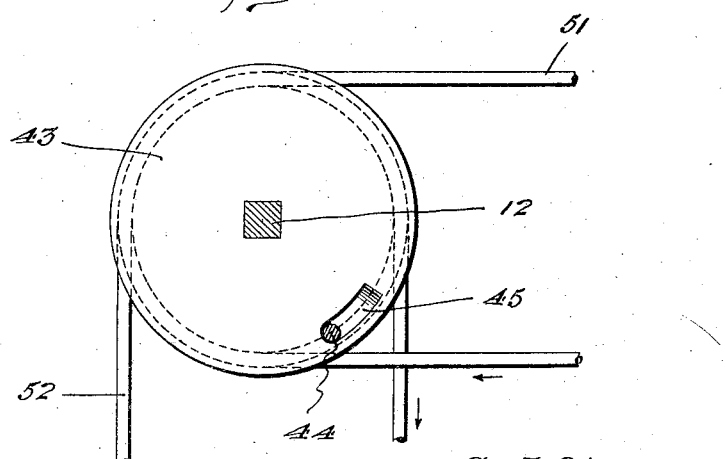

April 27, 1926.
G. A. STORRAR
STATION INDICATING SYSTEM
Filed Dec. 3, 1921
1,582,800
5 Sheets-Sheet 2
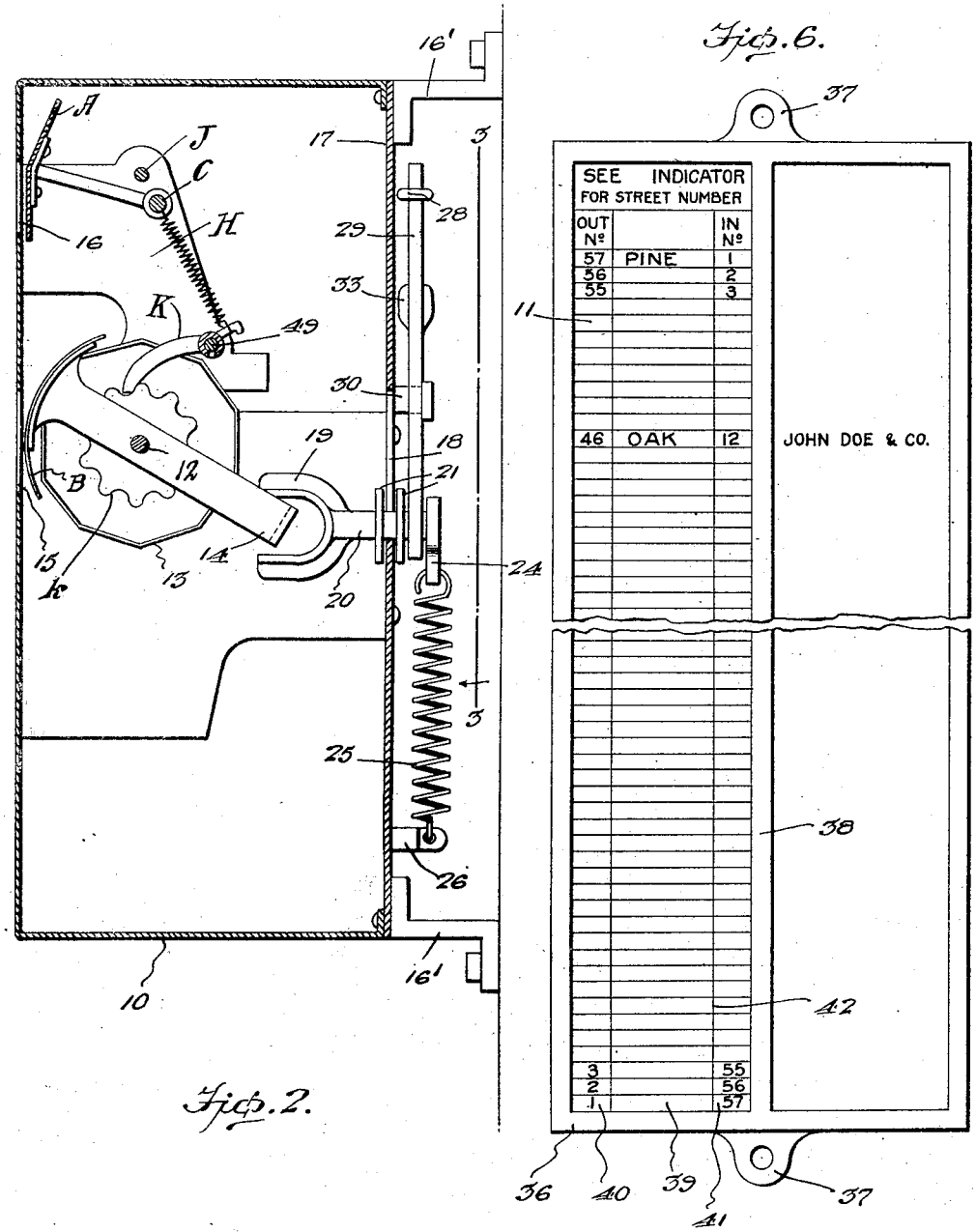

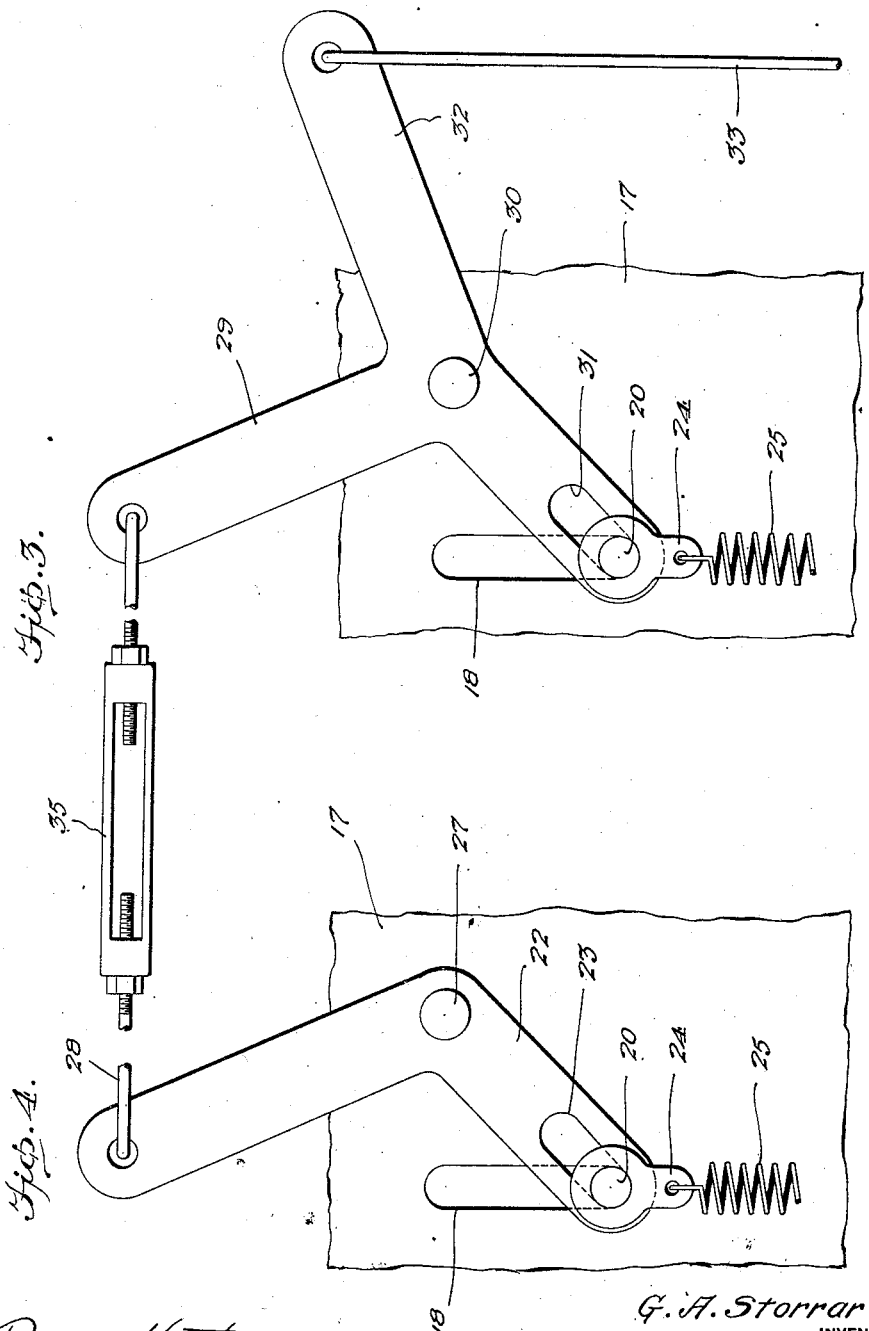

April 27, 1926.                                  1,582,800
                     G. A. STORRAR
                STATION INDICATING SYSTEM
                  Filed Dec. 3, 1921          5 Sheets-Sheet 4
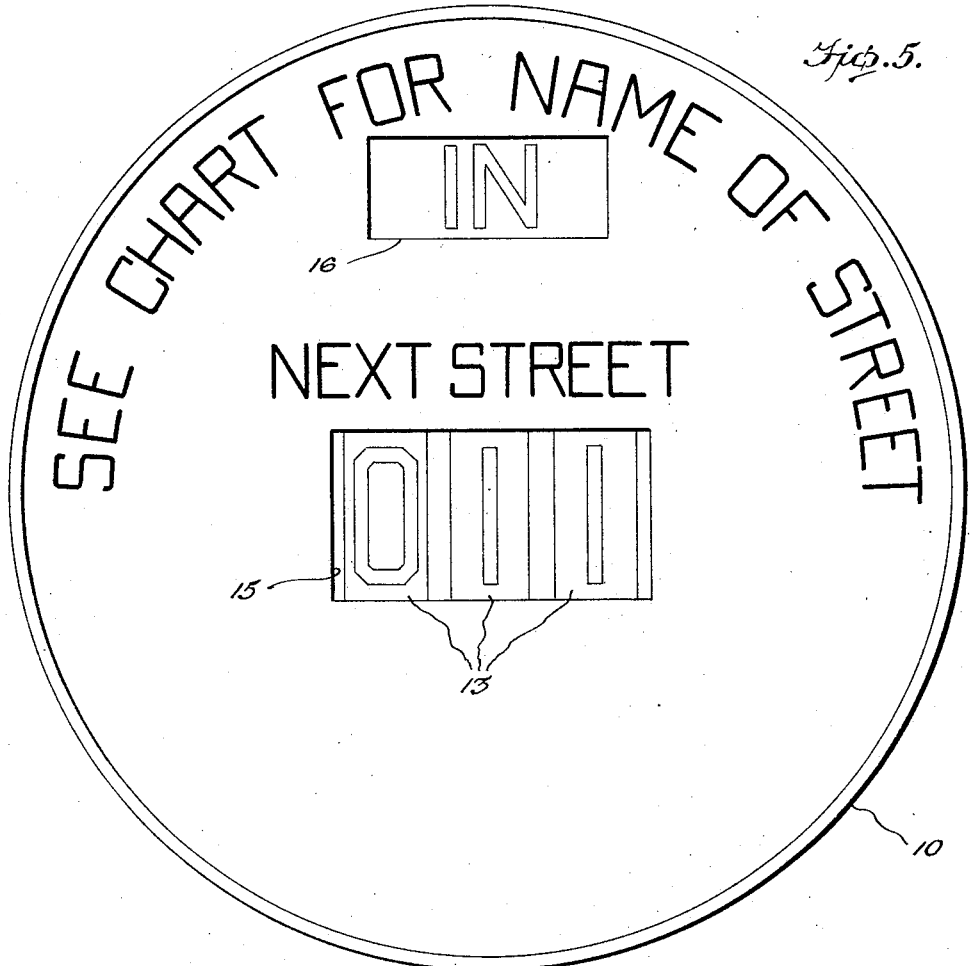
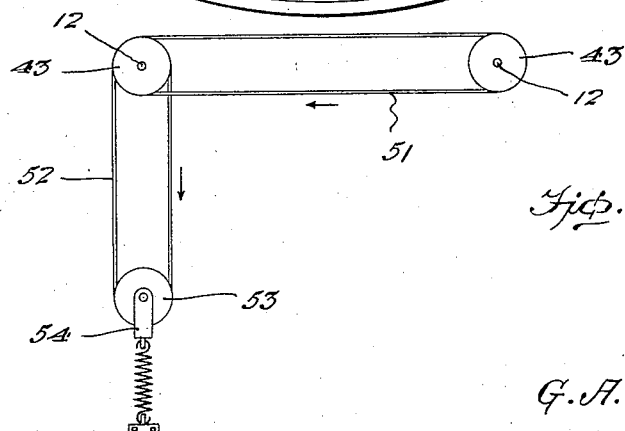
G. A. Storrar
INVENTOR April 27, 1926.
G. A. STORRAR
1,582,800
STATION INDICATING SYSTEM
Filed Dec. 3, 1921  5 Sheets-Sheet 5
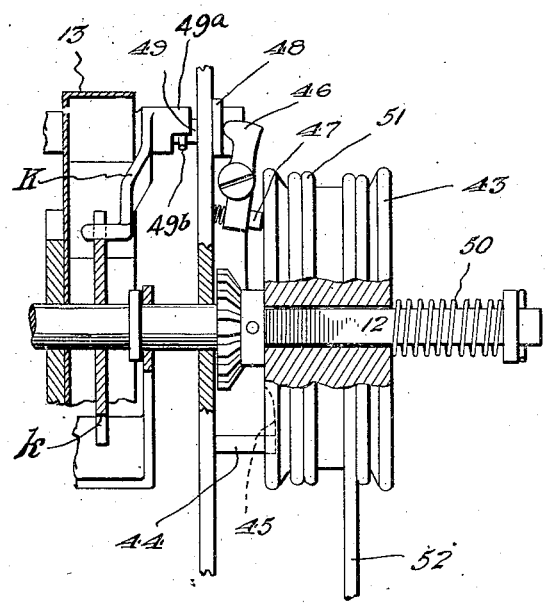
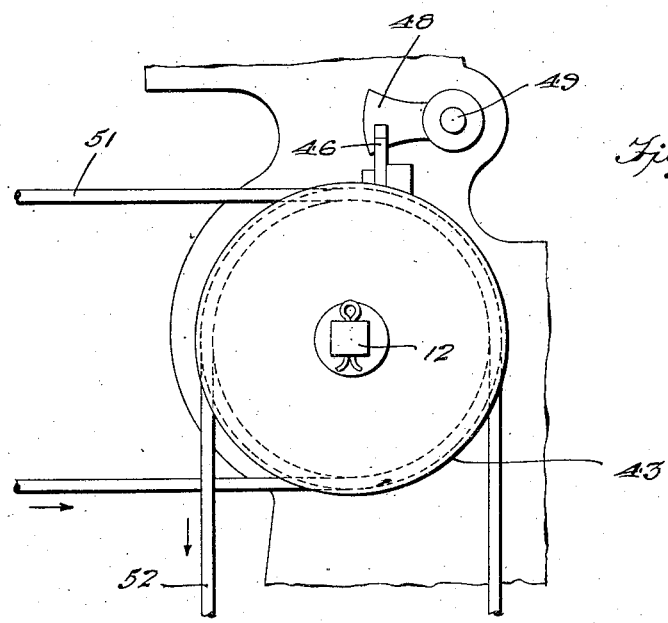
G. A. Storrar
INVENTOR
BY Victor J. Evans
ATTORNEY
WITNESS:

Patented Apr. 27, 1926.

1,582,800

UNITED STATES PATENT OFFICE.

GEORGE A. STORRAR, OF TACOMA, WASHINGTON.

STATION-INDICATING SYSTEM.

Application filed December 3, 1921. Serial No. 519,683.

*To all whom it may concern:*

Be it known that I, GEORGE A. STORRAR, a citizen of the United States, residing at Tacoma, in the county of Pierce and State of Washington, have invented new and useful Improvements in Station-Indicating Systems, of which the following is a specification.

This invention relates to improvements in station indicators and has for an object the provision of means whereby the names of stations or streets along the route of a car or other vehicle, may be quickly and accurately indicated.

Another object of the invention is the provision of an indicator for the above stated purpose, which may be used by cars traveling over different routes, provision being made whereby the same may be easily and quickly changed to adapt it for any particular route. For example, a car company may include a number of different routes and it may become necessary to switch the cars from one route to another, to meet demands of traffic, so that the indicator may be changed to adapt it for the particular route over which the car is travelling.

Another object of the invention is the provision of a station indicating mechanism, including means which render it especially valuable as an advertising medium, the arrangement being such that an occupant of the vehicle may readily read the advertisement of merchants along the route and the name of the street at which a particular merchant is located.

Another object is the provision of an indicating mechanism, which may be operated by the motorman or driver of the vehicle and arranged so that the operator may quickly determine whether or not the indicator is properly set for the next station, provision further being made, whereby an operator may simultaneously control a plurality of indicators.

With the above and other objects in view, the invention further includes the following novel features and details of construction, to be hereinafter more fully described, illustrated in the accompanying drawings and pointed out in the appended claims.

In the drawings:—

Figure 1 is a longitudinal sectional view through one end of a car with the invention applied.

Figure 2 is an enlarged sectional view taken vertically and centrally through the indicating device and its operating mechanism.

Figure 3 is a section on the line 3—3 of Figure 2, and showing the mechanism for operating the forward indicator.

Figure 4 is a similar view showing the mechanism for operating the indicator, that is, the indicator viewed by the passengers.

Figure 5 is a large face view of the indicator.

Figure 6 is an elevation partly broken away showing the chart and its supporting frame.

Figure 7 is a diagrammatic view illustrating the manner of connecting the plurality of indicating mechanisms, whereby they may be simultaneously reset.

Figure 8 is a fragmentary plan view showing a portion of the interior of the indicating device to illustrate the resetting roller.

Figure 9 is a detail sectional view taken longitudinally of the main shaft of the indicating device.

Figure 10 is a like view taken transversely of said shaft.

Referring in detail to the drawings, wherein like characters of reference denote corresponding parts, the invention which is shown as applied to a street car includes an indicating device, designated by the reference character 10 and a chart indicated at 11.

Various types of indicating devices or similar structures may be employed, the device shown being of the type ordinarily employed in street cars as fare registers to indicate the number of fares collected and the direction of travel of the car during such collection. For example the points of the compass may be used to indicate the direction of travel of the car during collection of a certain number of fares, or the words "In" and "Out" to indicate that the car is travelling out or in a direction away from the barn, or in toward the barn, all of which will be readily understood. These indicators are positioned within plain view of the passengers and if desired more than one indicator may be employed and all simultaneously controlled by a single operator. This is especially useful where a train is made up of more than one car, or where a motorman occupies a vestibule normally shut off from the passengers. In the latter event one indicator is placed within the passenger compartment of the car in plain view of the occupants and the other indicator placed in convenient position to be viewed by the operator. He may thus determine whether or not the indicator in the passenger compartment is properly set for the next street or station. This last mentioned arrangement is illustrated in the drawing.

For the purpose of obtaining a clear understanding of the operation of the invention, a part of an indicating mechanism is illustrated. This mechanism includes a main shaft 12, upon which is mounted a plurality of number wheels 13, which operate in the usual manner. That is, the unit wheel makes a complete revolution before motion is transferred to the tens wheel and the latter makes a complete revolution before motion is imparted to the hundreds wheel. The operating member in the present device is in the form of a yoke 14 which is mounted upon the shaft 12 and extends transversely of the number wheels 13, so that when the yoke 14 is moved pivotally in one direction, movement will be imparted to the number wheels in the usual manner, but these wheels will be held against reverse movement by a dog and ratchet mechanism, as in the ordinary fare register. These number wheels are visible through a sight opening 15 formed in the face of the device and consecutively display numbers from 0 to 999. In addition the device 10 is provided with a sight opening 16, within which is visible the words "In" or "Out", the said words being alternately displayed at each resetting of the number wheels, that is, when the latter are returned to zero.

The indicating devices 10 are similar in construction and are each similarly mounted, being secured upon brackets 16', which include base plates 17, each of the latter being provided with an elongated slot 18. Extending through the slots 18 of the base plates of each bracket, is a vertically movable member which includes a yoke 19 which embraces the transverse bar of the yoke 14, and has a shank 20, the latter passing through the slot 18 and having guide collars 21 upon opposite sides of the face plate 17. The indicating device 10 which is within the passenger compartment of the car has connected to the shank 20 of its yoke 19, a bell crank lever 22. One arm of this lever is provided with a slot 23 which receives the shank 20 and the inner end of the said shank has an arm 24 secured thereon. This arm serves to retain the bell crank 22 upon the shank 20 and in addition, serves as a means of connection for one end of a spring 25, the opposite end of which is secured to a stationary pin 26. This spring serves to normally hold the shank 20 in the lower end of the slot 18 and return it to this position after the pin has been elevated for the purpose of moving the yoke 14 beyond the indicating device.

The bell crank 22 is pivotally mounted as shown at 27 and has its opposite end connected to one end of a wire or cable 28. The opposite end of this wire or cable is connected to one arm 29 of a threeway lever which is pivotally mounted as shown at 30. One of the three arms of this lever is provided with an elongated slot 31, which is adapted to engage the shank of a vertically movable operating member which is connected to the operating yoke of the indicating device positioned within the vestibule of the car. This form of connection is similar to the form of connection described in connection with the first mentioned device. In addition, the lever which carries the arm 29 is provided with an arm 32, to which is connected one end of a cable 33 which extends within convenient reach of the motorman. The cable 28 passes over suitable guide pulleys 34 and is provided with a turn buckle 35 so that it may be properly tensioned.

As thus far described, it will be seen that by pulling downward on the cable 33, both the threeway lever and the bell crank lever 22 will simultaneously move the yokes 14 of each of the indicating devices so that the numbers displayed upon each of the devices will be identical. This will permit the motorman to determine just what number is displayed within the passenger compartment of the car so that he may ascertain whether or not the proper number is shown.

The numbers displayed within the opening 15 of the indicating device are intended to serve as a key whereby the name of the next approaching street or station may be found.

The names of the streets or stations are contained upon charts conveniently positioned adjacent the seats occupied by the passengers, so that they may be readily seen. These charts are preferably contained within frames 36, having apertured lugs 37 for the passage of suitable fastening devices, by means of which these arms may be secured to the panels between the car windows. The frames 36 are divided into separate compartments by means of a strip 38 and removably positioned in one of the compartments is a chart 11. The chart is preferably provided at its top with instructions reading "See indicator for street number" and below these instructions the chart is divided into a central section 39 and side sections 40 and 41, division being made by means of vertical lines 42. The central section or space 39 is designed to contain the names of the streets or stations passed by the car, while the spaces 40 and 41 contain numbers which correspond to the numbers displayed within the sight opening 15 of the indicating device. In addition, the members within the spaces 40 and 41 are arranged to be read in accordance with the direction of travel of the car and contain indicia at the top which corresponds to the indicia shown within the space 16, such as 'Out" and "In". As an example, the first space shown on the chart 11 contains the name of "Pine Street" and opposite within the column or space 41 which is headed by the word "In", we find that Pine Street is #1 or the first street passed from the end of the route when the car is travelling 'in" or toward the barn. Further down the chart we find that the twelfth street passed is "Oak Street" and a passenger desiring to alight at this street will not be obliged to continually watch the indicating device, as he will know that he must pass eleven blocks before he will have to watch for his particular corner.

Another valuable feature of the invention resides in the fact that it is especially adapted for use as an advertising medium. In the space within the frame opposite that occupied by the chart 11, are displayed the names of various advertisers and these advertisers are placed so that their names will be opposite the street upon which they are located. As an example, John Doe & Company are located on Oak Street and their name appears opposite Oak Street, so that a person unfamiliar with their location will know exactly at what corner to alight to reach their place of business. While the indicating chart is shown in the form of a strip contained within the frame, it is apparent that the said chart may be differently made and it is not the purpose of the present application to confine the invention to that particular form of chart.

In a car line where the cars travel to a certain point at the end of a route and retravel or practically retravel the same route on the return trip, it is necessary to reset the indicating device at the end of the route. This is accomplished in substantially the same manner as that employed for resetting the usual fare register, that is, by rotating the main shaft 12. Instead of using a key for this purpose, the main shaft 12 of each of the indicating devices has mounted thereon a grooved pulley 43, the said pulley being slidable longitudinally of the shaft 12, but rotatable with said shaft. Extending from the frame of the indicating device is a pin 44, which engages a cam groove 45 formed in the inner face of the pulley 43. Pivotally mounted upon the frame of the indicating device 10 is a dog 46, which is provided with a finger 47. This finger bears against the inner face of the pulley 43 and by this means is prevented from moving inward beneath an arm 48 secured upon the resetting shaft 49 of the indicating device. When the pulley 43 is rotated in one direction, it is moved outward longitudinally of the shaft 12 against at the action of a spring 50. This disengages the inner face of the pulley from the finger 47 of the dog 46 and permits the dog to move inward beneath the arm 48 as the latter is raised during the operation of the resetting device. The number wheels 13 may thus be reset in the ordinary manner until they are returned to zero. During this resetting of the wheels 13, the indicia contained within the opening 16 is changed from "in" to "out" or vice versa in the usual manner.

For the purpose of simultaneously resetting both of the indicating devices, the wheel 43 of each device is connected by a cable 51, which is preferably wound around the peripheries of the pulleys in a manner to prevent slipping. An additional cable 52 is wound about the pulley 43 of the motorman's indicating device and this cable also passes about an idler pulley 53 which is mounted in a movable spring tensioned bearing arm 54 so as to maintain the cable 52 at the proper tension. By operating the cable, the motorman of the car may rotate the indicating devices 10 so that they will be simultaneously reset.

As previously stated, the indicating devices 10 are of the type ordinarily employed in street cars as fare registers to indicate the number of fares collected and the direction of travel of the car during such collection, the words "In" and "Out" being used for the same purpose as in the fare register, while the number wheels which are ordinarily used to indicate the number of fares collected are in the present case used to indicate numbers assigned to the various streets along the route as shown upon the chart illustrated in Figure 6. In the present invention the face of the indicating device has imprinted thereon directions "See chart for name of street" while above the number wheels are the words "Next street".

In Figure 2 there is illustrated a portion of the ordinary register mechanism, the direction plate or panel being indicated at A, while the usual shutter which operates beyond the opening 15 and in front of the number wheels 13, is indicated at B and is carried by the yoke 14. The arm which carries the plate or panel A is mounted upon a shaft C which is in turn mounted within the frame H of the register mechanism, the said frame including a tie rod J.

Mounted for free pivotal movement upon the shaft 49 is a collar 49ª from which extends a dog K, the free end of the dog engaging a toothed wheel *k* which is fast upon the main shaft 12. This permits the shaft 12 to rotate in one direction as the register is operated, but prevents retrograde rotation. The collar 49ª is provided with a shoulder which is engaged by a pin 49ᵇ extending from the shaft 49, so that when the said shaft is rotated in an opposite direction by the usual register mechanism which connects the main shaft and the shaft 49, the pin 49ᵇ will engage the shoulder of the collar 49ª and lift the dog K out of engagement with the toothed wheel *k*. This occurs during the resetting operation of the register and during this operation, the dog 46 will engage beneath the arm 48 in the manner previously described so as to hold the dog K disengaged from the toothed wheel until completion of the resetting operation.

By the use of the present invention, the names of stations or streets may be accurately indicated and the indicating device may be operated from a remote point, so that the operator may control devices in more than one car or more than one device in a single car. In addition, the invention will at all times remain accurate and is not open to the objection usually found in devices of this character, such as stretching of the belt or canvas which contains the names of the streets or stations, so that in a short time the said belt or canvas will be useless. In addition it is not cumbersome or unsightly and provides a valuable advertising medium which may serve to defray the expense of installation and in addition provide a source of continued revenue.

The invention is susceptible of various changes in its form, proportions and minor details of construction and the right is herein reserved to make such changes as properly fall within the scope of the appended claims.

Having described the invention what is claimed is:—

1. A station indicator for vehicles comprising in combination with an indicating mechanism adapted for the consecutive display of numbers and for indicating the direction of travel, a chart divided into a plurality of spaces, indicia upon one of said spaces for indicating the names of the stations along the route traveled, numbers arranged in the spaces opposite the station indicia, said numbers corresponding to the numbers of the indicating mechanism arranged in reverse order upon each side of the station indicia and indicia at the top of the number spaces corresponding to the direction of the indicating means of the indicator, whereby the names of stations may be determined.

2. A station indicator comprising in combination with a plurality of separate indicating devices, each including a vertically movable operating element, a bell crank lever pivotally mounted upon one of the indicating devices and operatively connected to the vertically movable operating element thereof, a three-arm lever pivotally mounted upon the other indicating device and having one of its arms operatively engaged with the operating element of said other indicating device, means connecting one arm of the three-arm lever and one arm of the bell crank lever to provide for simultaneous operation of the indicating devices when either lever is operated and means connected to one arm of the three-arm lever to provide operating means.

In testimony whereof I affix my signature.

GEORGE A. STORRAR.